VACUUM CHOPPER SYSTEM

Filed July 31, 1958 2 Sheets-Sheet 1

INVENTOR.
GEORGE V. YOUNG
BY Harry R. Lubcke
AGENT

June 19, 1962 G. V. YOUNG 3,040,263

VACUUM CHOPPER SYSTEM

Filed July 31, 1958 2 Sheets-Sheet 2

INVENTOR.
GEORGE V. YOUNG

BY Harry R. Lubcke

AGENT

United States Patent Office 3,040,263
Patented June 19, 1962

3,040,263
VACUUM CHOPPER SYSTEM
George V. Young, Los Angeles, Calif., assignor, by mesne assignments, to Endevco Corporation, Pasadena, Calif., a corporation of California
Filed July 31, 1958, Ser. No. 752,274
5 Claims. (Cl. 330—10)

My invention relates to stabilized means for producing an alternating current proportional in amplitude to the amplitude of a slowly varying direct current, and more specifically to a stabilized system of electrical amplification in which the alternating current is produced by a vacuum enclosed magnetostriction driven capacitor, the alternating current amplified and then reconverted to direct current.

This application relates to the same art as my copending patent application for "High Frequency Chopper System," Serial No. 702,311, dated December 12, 1957, now Patent No. 2,927,274.

Although means are provided in the above-referenced application to reduce the drift effects caused by variation of the work function of the surface of the vibratable capacitor plates I have found that these effects are of sufficiently large magnitude in practice to preclude precise functioning of the system. For instance, alteration of the humidity and of the chemical composition of the gas surrounding the capacitor plates, as by blowing one's breath near them, causes a serious change in the level of the amplified current for a given input. While some protection can be afforded by the usual housing for such apparatus it will be understood that any prolonged change in ambient conditions will ultimately pass into the housing and affect the capacitor plates. By enclosing this portion of the system in a vacuum envelope I am able to improve the stability of the system by a factor of ten, in practice. Only with this order of improvement is precision of instrument grade attainable in this type of system.

Another departure from the above-referenced application pertains to a feedback loop employed to maintain the conversion efficiency of the vibratory capacitor constant regardless of a wide variety of ambient conditions. Rather than to employ a separate stationary capacitor plate as an element in this loop I accomplish the same result by modulating a relatively high frequency carrier with the vibratory frequency at the amplitude of vibration of the vibratory capacitor. Thus, only two capacitor plates are required, one stationary and one vibratory. In the feedback loop the electrical amplitude corresponding to the vibratory amplitude is compared with a constant electrical amplitude and the result is employed to regulate the driving power to the magnetostrictive vibratory element.

I am able to employ a reentrant portion of the vacuum enclosure as a quarter-wave sonic resonant element between the magnetostriction driver and the movable capacitor plate.

An object of my invention is to provide a system for amplifying low level direct current by conversion to and amplification at alternating frequencies in the sonic or supersonic ranges.

Another object is to provide a vacuum type variable capacitor chopper of particularly stable characteristics.

Another object is to provide a feedback circuit to stabilize a two plate vibratory capacitor.

Another object is to provide a vibratory capacitor type of amplifying system that is of relatively small size and which requires relatively small power to operate the vibratory capacitor.

Other objects will become apparent upon reading the following detailed specification and upon examining the accompanying drawings, in which are set forth by way of illustration and example certain embodiments of my invention.

Figure 1:
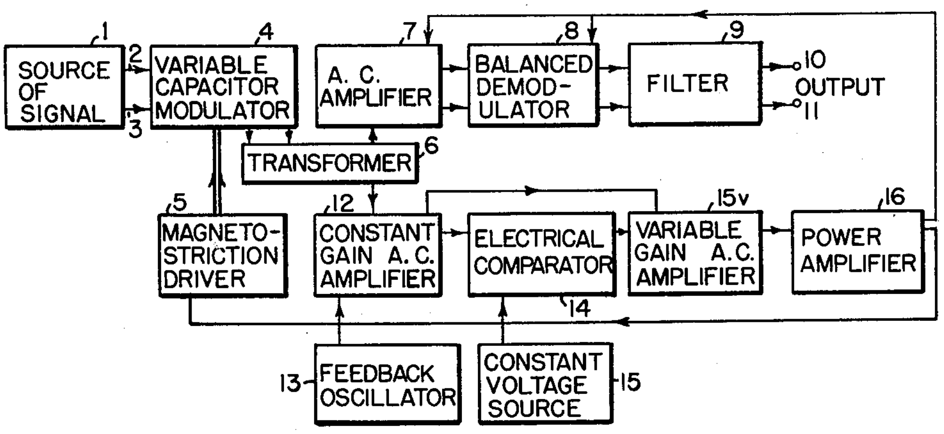
FIG. 1 shows a block diagram of the circuit functioning of my system.

In the block diagram of FIG. 1, numeral 1 represents the source of the signal to be amplified. This may be a strain gage, an accelerometer, a pressure gage, an ionization chamber or other similar transducers. The outputs of these devices are characteristically low energy level varying direct currents. My invention may also be employed to amplify alternating currents having a frequency less than about half the frequency of vibration of the capacitor plates. While the amplification by my system is not limited to feeble alternating or direct currents, or a combination of these two, it finds its greatest use at such low levels and where it is desired to impose a minimum load upon the signal source.

Figure 2:
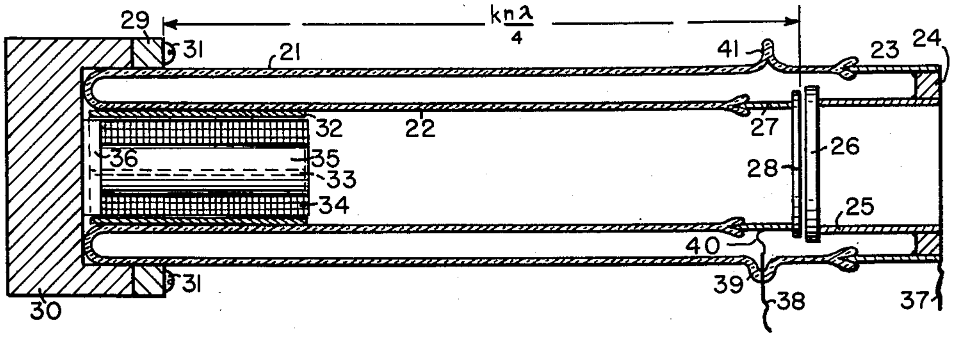
FIG. 2 shows a side elevation view of my vacuum vibratory capacitor, partially in section.

In this embodiment I am able to accommodate a differential input. This is indicated by the two conductors 3 and 2 connected to source 1 and to variable capacitor modulator 4. This latter device is illustrated in FIG. 2 and functions to produce an alternating current proportional to the potential impressed upon it by the signal from source 1. Magnetostriction driver 5 transduces an auxiliary alternating current into motion of the movable plate of the vibratory capacitor and forms a part of the assembly of FIG. 2.

The alternating electrical output from the capacitor modulator 4 impressed upon balanced transformer 6. This transformer allows a differential input to the system. The main signal channel continues to A.C. amplifier 7 via an unbalanced secondary. Amplifier 7 provides the main signal gain of the system. In balanced demodulator 8 an unbalanced to balanced transformer and a balanced demodulator recover the form of the original signal in envelope form. Low pass filter 9 removes the alternating current component introduced by modulator 4, the envelope per se remaining as a greatly amplified reproduction of the form of the signal from source 1. The useful amplified output is obtained at balanced terminals 10 and 11.

Constant gain A.C. amplifier 12 is connected to another unbalanced secondary of transformer 6 and forms the start of the feedback loop provided to keep the gain of the conversion part of the system constant regardless of ambient conditions. Feedback oscillator 13 introduces an electrical waveform having several times the frequency of the frequency of vibration of capacitor 4. The waveform from oscillator 13 is modulated at the input of amplifier 12 by the vibratory frequency. After a constant amount of amplification the result is impressed upon electrical comparator 14. A constant voltage source 15 is also connected to the electrical comparator. The levels of these two inputs are compared in comparator 14 and a difference waveform is secured as an output. This controls the gain of variable gain A.C. amplifier 15v which amplifier is also fed from the output of amplifier 12. Accordingly, the gain of the feedback channel is automatically altered here so that a uniform vibratory displacement of the movable plate of capacitor 4 is obtained regardless of various changes in ambient conditions. The output of power amplifier 16 is connected to magnetostriction driver 5, as by conductor 17.

Turning now from the above brief description to FIG. 2, the electromechanical aspects of the system are there illustrated. Element 21 is a vacuum enclosure or envelope having a deep reentrant portion or part 22. A suitable material for this is glass, particularly the type used for power vacuum tube construction, such as the Corning type 7052. The glass is sealed to a metal cylinder 23, which is of a metal sealable to glass, such as Kovar. Spacer ring 24 is suitably welded, brazed or soldered to cylinder 23, and likewise in turn to inner cylinder 25. The latter supports stationary capacitor plate 26. The reentrant portion 22 similarly terminates in movable Kovar tube 27 and movable capacitor plate 28.

The reentrant portion constitutes a sonic or supersonic resonant member having a wavelength of a quarter-wave, or of a multiple of a quarter-wave. Enclosure 21 is securely bonded to mounting plate 29 with an epoxy cement. The mounting plate is in turn fastened to mass 30 by at least four screws 31. The plate and mass may be formed of Armco soft magnetic iron in order to act as a magnetic shield to shield adjacent apparatus from the magnetostriction field, such as the capacitor plates 26, 28 and the wiring to them. The mass is necessary to increase the resonant "Q," or sharpness of response, to an attainable value of the order of 200. This gives excellent frequency stability to the vibration and multiplies the mechanical motion of the plate Q times.

The magnetostriction element proper is a cylinder 32, having a longitudinal slit 33 to inhibit eddy currents. This cylinder is normally of nickel, a satisfactory magnetostrictive material. It is bonded to the inner surface of the reentrant portion 22 with epoxy so that elements 32 and 22 are structurally one. When supplied with an energy feedback loop, such as elements 4, 6, 12, 14, 15*v*, 16 and 5 of FIG. 1, magnetostrictive oscillations are set up in the same manner as in the usual electronic oscillator. That is, any energy disturbance starts the flow of energy in the loop and the frequency in this device is determined by the mechanical resonance of the reentrant portion in longitudinal vibration.

The quarter-wave dimension is conveniently measured from the bonded mounting plate 29 to the working surface of movable plate 28. Because of the folded nature of the free-to-vibrate portion of the glass structure the distance designated $kn\lambda/4$ is shorter than a quarter wavelength when $n=1$. Thus, $k$ has a value less than one and can be determined for any particular structure. While a value of one for $n$ is often to be preferred for compactness, other integral values may be employed where high ultrasonic frequencies are employed.

Immediately within the magnetostrictive cylinder 32, but not touching the same as would cause damping of the vibrations, is coil 34. This coil is composed of a few hundred turns of wire, the number of turns being determined by the impedance required to match the output of power amplifier 16. Within the coil is a soft iron core 35. This is provided to reduce the reluctance of the magnetic path of the magnetostrictive driver, thus increasing the efficiency. A solid aluminum cylinder 36 is employed to mount the coil and the core to the mass 30 so that these may be structurally free of the magnetostrictive cylinder 32.

Electrical connections to the capacitor plates are made at 37 to the stationary plate by soldering a conductor to Kovar cylinder 23 and at 38 by a conductor which passes through terminal tubulation 39 and by means of a flexible strap 40 which connects to the Kovar cylinder 27 of the movable plate by spot welding. Strap 40 is thin and sufficiently flexible to avoid damping the vibration of movable plate 28.

At any other convenient point on the outer surface of envelope 21 a seal-off tubulation 41 is located. In constructing the vacuum vibratory capacitor the last step is to evacuate the inner space. Known vacuum techniques, such as baking-out to remove occluded gases, and others to insure continuance of a high vacuum during the life of the device, are employed.

For precise work a temperature differential may not be allowed to exist between the plates, since the work function thereof and therefore one cause of drift is affected by temperature. The high vacuum which I employ prevents migration of gas or other contaminants from one plate to the other or from any part of the interior surface. This stabilizes the work function with respect to these possibilities of variation. In order that not even a small temperature differential build up between the plates I prefer to enclose the structure of FIG. 2 in a temperature controlled enclosure. Such enclosures are known and thus are not illustrated. When the temperature therein is maintained constant to within a fraction of a degree centigrade I have been able to reduce drift to a few microvolts per day.

Figure 3:
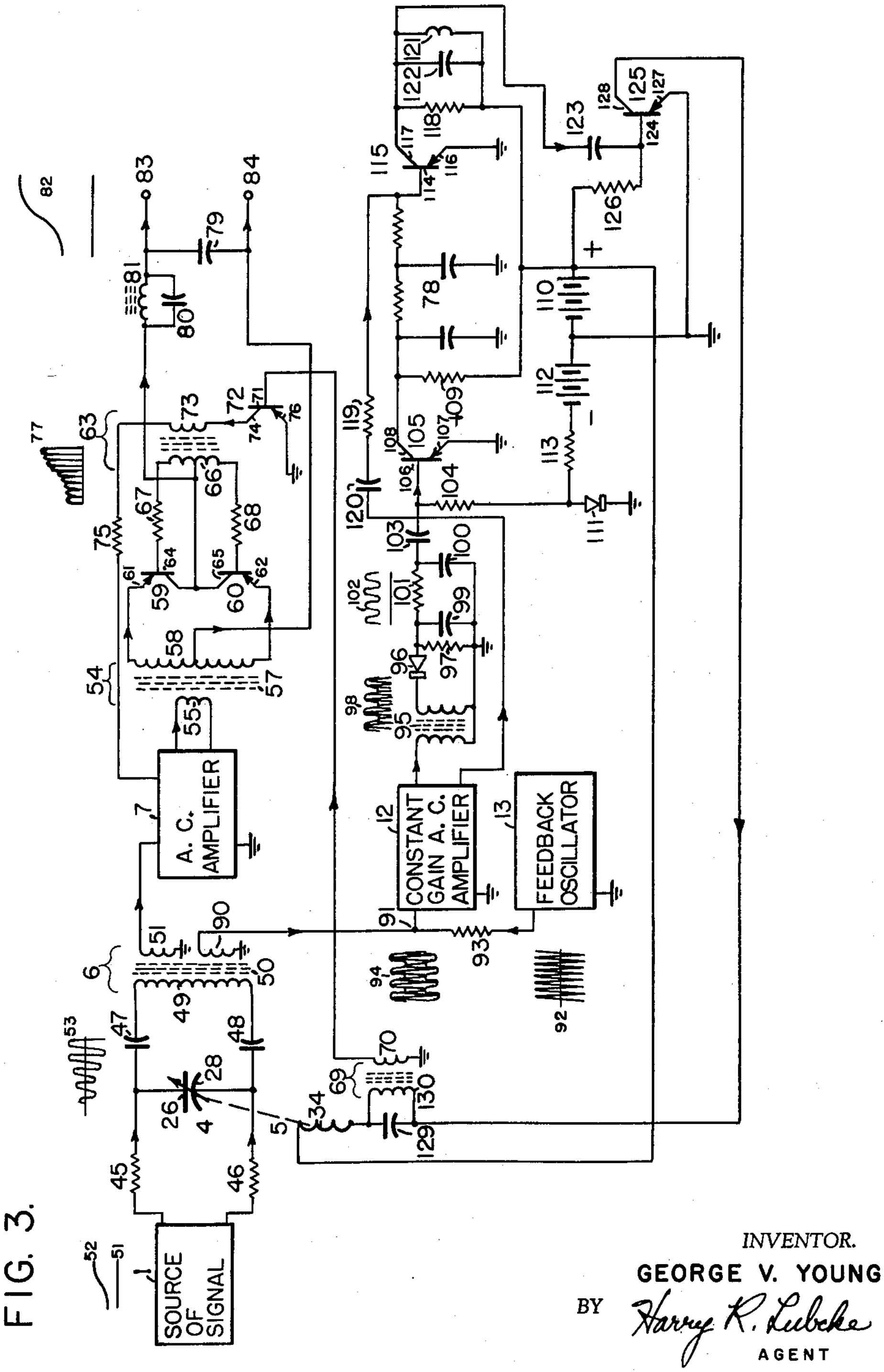
FIG. 3 shows the schematic circuit diagram of my system.

We now turn to a consideration of the schematic diagram of FIG. 3. Two conductors connect to the source of signal 1 and to isolation resistors 45, 46. These may each have a resistance of the order of one-quarter megohm. The other side of each of these resistors connects to the vibratory capacitor; resistor 45 to stationary plate 26 and resistor 46 to movable plate 28. The signal may be a direct potential, a direct potential which varies from time to time, a sinusoidal waveform or any other waveform of alternating potential having frequency components up to a limit of several thousand cycles in a usual embodiment. Since the capacitance of the vibratory capacitor does not exceed a very few hundred micromicrofarads ($\mu\mu$f.), the input impedance of my system is substantially infinite.

As has been described, the magnetostrictive feedback loop vibrates at a frequency determined by the quarter-wave dimensions of the reentrant portion 22 of FIG. 2. Assume initially that this frequency is of the order of 4,000 cycles per second. Blocking capacitors 47, 48 each have a capacitance of the order of 500 $\mu\mu$f. and thus effectively pass frequencies of 4,000 cycles to the primary of transformer 6, which has a minimum impedance of the order of a half megohm. On the other hand, any direct potential which may also be present along with alternating potentials of frequencies less than half, say, 4,000 cycles in the general case, will not be shunted by the impedance of primary 49 of transformer 6.

Transformer 6 has a powdered iron or other type core 50, which is efficient at sonic and supersonic frequencies. I prefer to employ transistors throughout my system for active elements, and in such a structure secondary 51 of the transformer has a step-down ratio to match the relatively low input impedance of transistorized amplifier 7. Were amplifier 7 of the vacuum tube type secondary 51 would preferably have a step-up relation to primary 49.

Amplifier 7 has constant gain and is comprised, for example, of two transistor stages with negative feedback for gain stabilization, with a gain of the order of twenty times (26 db) and is capable of amplifying with fidelity the frequencies at and around the vibratory frequency. According to the modulating process, the frequencies present at the vibratory capacitor and beyond are the vibratory frequency plus and minus the modulating frequency. Should the frequency of the input voltage at any instant be 1,000 cycles and the vibratory frequency be 4,000 cycles then frequencies of 3,000 and 5,000 cycles are present.

Amplifier 7 may also include a band pass filter to limit its response to frequencies of interest. Assuming 1,000 cycles to be the maximum input frequency from the signal source, the pass band of the filter would be from 3,000 to 5,000 cycles. This filter may be of conventional design, as from the handbook, "Reference Data for Radio Engineers," 4th ed., International Tel. and Tel., p. 170, for constant $k$ sections and p. 173 for $m$ derived sections, both of which I employ in the usual manner.

The functioning of my apparatus is illustrated by the several small waveform graphs shown in FIG. 3. These have time as the abscissa and voltage as the ordinate.

An illustrative variation of signal is shown above source 1. In this, line 51 represents the zero or no-signal D.C. axis, while curve 52 represents a sample voltage variation, as arising from an increase in temperature experienced by a thermocouple constituting the source of signal.

Curve 53 represents the waveform appearing at and beyond vibratory capacitor 4. This signal has a rapid series of alternations arising from the mechanical variation of capacitor plate spacing at the frequency of magnetostriction resonance. These are modulated in amplitude according to the amplitude of the original signal 52, which appears as a varying potential upon the capacitor 4.

While not shown, the same waveform appears at the output of A.C. amplifier 7, but with increased amplitude.

The output of A.C. amplifier 7 is connected to transformer 54, to provide a balanced input to a succeeding phase-sensitive demodulator. Primary 55 introduces the amplified vibratory capacitor signal to the transformer. Core 57 is a powdered iron or low loss equivalent core, as has been described. Secondary 58 is centertapped to give a push-pull output to drive transistors 59 and 60 by means of emitters 61, 62, respectively. These transistors may be of the 2N43 type. The collectors are connected together and to the center tap of an output impedance and transformer 63. The bases 64, 65 of the transistors are connected to the extremities of the winding 66 through equal resistors 67, 68, each having a resistance of about 1,000 ohms.

Another impedance and transformer 69 is in the driving circuit of magnetostrictive means 5. By means of a secondary 70 a portion of the vibratory drive frequency energy is impressed upon the base 71 of transistor 72. This is impressed upon the phase demodulator by means of primary 73 of transformer 63 from collector 74 of transistor 72. This transistor is overdriven by the excessive amplitude obtained from transformer 69. As a result, the sine wave from the transformer is converted into a square wave. This waveshape is preferred to energize the demodulator. The circuit is completed through resistor 75, A.C. amplifier 7 and emitter 76 of transistor 72. This alternately switches transistors 59 and 60 on and off as to the conductive state. When transistor 59 is "on," for example, a positive output will occur at the collector thereof if the phase of the A.C. amplifier is positive, and negative if the phase of the output of that amplifier is negative. The output amplitude equals the average output amplitude of half of secondary 58. The polarity at any instant is a function of the phase relation of that signal and the phase of the driving signal from transformer 69. The output from the demodulator is either in phase or 180° out of phase, and which is determined by the polarity of the input signal.

The output of the balanced demodulator is shown by waveform 77. This is full-wave demodulation and is roughly similar to waveform 53 in that the frequency and the variation of amplitude is similar. All half waves lie on one side of the axis in waveform 77, of course.

The final group of main signal path elements in FIG. 3 comprise the filter 9 of FIG. 1. This filter removes the carrier frequency introduced by the vibration of the capacitor plates, but does not remove any amplitude variations which may have occurred in the original signal. Accordingly, the capacitance of capacitor 79 is a fraction of a microfarad. The mutually shunted capacitor 80 and inductor 81 have a resonant frequency approximating that of the carrier frequency. The whole filter constitutes a low pass filter having a cutoff frequency lower than the carrier frequency but above the modulating frequency of any variation of the original signal. The resulting waveform is shown at 82. This is the envelope of waveform 77 and is a greatly amplified representation of the original waveform 52. The amplification may be of the order of a million times, or of any lesser magnitude. Waveform 82 cannot, therefore, be of the same scale as waveform 52.

Output terminals 83, 84 provide a balanced output with respect to ground.

The remaining portion of my system has to do with maintaining the conversion efficiency thereof at a constant value regardless of various ambient conditions.

Secondary 90 of transformer 6 conveys the impedance variation of circuit 26, 28, 47, 48, 49 caused by the variation of capacitance between the vibratory plates 26, 28 to junction 91. This junction is between the input to constant gain A.C. amplifier 12 and the output of feedback oscillator 13.

Feedback oscillator 13 may be of any type of oscillator providing an output of several volts at a supersonic frequency, as 30 kilocycles, which has stable operating characteristics. I employ an inductance-capacitance transistor oscillator, but since the exact circuit diagram is not critical it is not shown. The output waveform may be sinusoidal, is of constant amplitude and is shown at 92 in FIG. 3. Resistor 93 has a resistance of the order of 100,000 ohms. The variation of impedance at junction 91 modulates the amplitude of supersonic output at that point at the frequency of vibration of the vibratory capacitor plates. It is evident that if the amplitude of the vibration of the vibratory capacitor plates changes, so will the degree of modulation of waveform 94. If the gain of the oscillatory magnetostriction loop is altered as required to keep this degree of modulation constant then it is evident that the amplitude of vibration of the capacitor plates will remain constant. This is accomplished by the apparatus which follows in this loop.

Constant gain A.C. amplifier has a nominal gain, such as 100 times (40 db). Transformer 95 provides isolation between amplifier 12 and rectifier 96. Resistor 97, of about 50,000 ohms, completes the return path of this circuit to ground. The voltage waveform appearing across it is as shown at 98. This is a rectified version of waveform 94. Elements 99, 100 and 101 constitute a low pass filter having a cutoff frequency well below the carrier frequency of 30 kilocycles. Also, the time constant of resistor 97 and capacitor 99 is made somewhat less than a half cycle of the modulating (capacitor vibration) frequency of 4,000 cycles.

Coupling capacitor 103 continues the description of the elements comprising the electrical comparator 14 of FIG. 1. This capacitor has a capacitance of the order of 0.002 microfarad. Companion resistor 104 has a resistance of 20,000 ohms. Transistor 105 is an important part of the voltage comparator. The base 106 thereof is connected to the junction of coupling elements 103 and 104. The emitter 107 is grounded. The collector 108 is connected to an output resistor 109 of 20,000 ohms resistance. The latter is connected to the positive terminal of a source of operating voltage of nominal value, as 28 volts, of battery 110.

Element 111 is a Zener diode which has a constant voltage drop of the order of 5 volts. It constitutes the most important element of the constant voltage source 15 of FIG. 1. Battery 112 provides a negative voltage from ground of the order of 28 volts. Resistor 113 has a resistance of the order of 6,000 ohms and connects the negative terminal of the battery to the Zener diode. The latter, being also connected to the end of resistor 104 opposite to the junction between elements 103 and 104 previously referred-to places a constant back-bias on the base of transistor 105 of 5 volts. This must be overcome by a greater positive peak 4,000 cycle voltage from the filter described. This voltage has the waveform shown in 102. When, and only when, the positive peak value of this waveform is greater than 5 volts does current flow in the collector circuit of transistor 105. The normal output from the filter is arranged to be of the order of 6 volts, so that the negative bias is overcome. With these amplitudes the feedback loop is in equilibrium at the mid-characteristic of transistor 105. Should the amplitude of vibration of vibratory capacitor 4 alter for any reason the waveform 102 alters correspondingly and compensatory control is establish. Transistor 105 is chosen to have a high beta function, of the order of 100. Thus the collector current response for a small signal change upon the base is large.

The regulatory output of transistor 105 is applied to the base 114 of a second transistor 115. This transistor is of the variable gain type, such as the NPN silicon type 2N117. Emitter 116 is connected directly to ground. Collector 117 is connected to the positive terminal of battery 110 through resistor 118, of 5,000 ohms resistance. The 4,000 cycle output of transistor 114 is adjusted by transistor 105 so that the amplitude of 4,000 cycle energy arriving at transistor 105 from around the feedback loop is just sufficient to overcome the bias of the Zener diode 111.

There is also a connection from the output of constant gain A.C. amplifier 12 to base 114 so that the 4,000 cycle energy required to sustain vibration of the magnetostriction driver 5 persists throughout the feedback loop. Resistor 119 has a resistance of the order of 150,000 ohms and capacitor 120 a capacitance of 0.001 microfarad. These serve as isolation in the connection between amplifier 12 and variable gain amplifier 15. The latter is comprised chiefly of transistor 115, in the connection described.

In the collector circuit of transistor 115 inductor 121 and capacitor 122 are connected in a parallel resonant circuit across resistor 118. This is a phase adjusting circuit employed to shift the phase of the sonic energy flowing in the feedback loop to properly reinforce the magnetostriction oscillations. For a frequency of 4,000 cycles the capacitor has a value of the order of 0.02 microfarad and the inductance is of the order of 50 millihenries. For other sonic and low ultrasonic frequencies the values are proportional, and for minor phase shifts to accommodate any particular embodiment minor changes from the values given may be made.

Through coupling capacitor 123 of 0.4 microfarad capacitance the output of transistor 115 is conveyed to power transistor 125, specifically to base 124. The base return is through resistor 126 and to the positive terminal of battery 110. Transistor 125 may be of the 2N389 type capable of 35 watts dissipation. A heat dissipating sink with radiating fins is desirable in maintaining the temperature of this transistor within operating limits.

Emitter 127 of transistor 125 is connected directly to the negative terminal of battery 110. Collector 128 is connected to one end of coil 34, which is the magnetostriction drive coil also shown in FIG. 2. The other end of this coil is connected through capacitor 129 and the inductor-primary 130 of transformer 69 to the positive terminal of battery 110.

Capacitor 129 is employed to at least partially tune the electrical circuit composed of coil 34 and that capacitor to series resonance at the sonic operating frequency. This reduces the reactive volt-amperes required to drive the magnetostrictive structure and so increases the efficiency. Inductor-primary 130 serves as a direct current path for the operating current of the transistor and as a direct current bias on the magnetostrictive element so that vibration is at the fundamental frequency of the sonic energy and not at twice this frequency, as would be the case without a direct current bias. Power transistor 125 operates as a class A amplifier and so the constant component of collector flow supplies the desired direct current. Transformer 69 is constructed so that the inductance of primary 130 is a fraction of a henry. Capacitor 129 has a capacitance of approximately a half microfarad.

The above-described feedback loop provides a self-compensating drive for the magnetostriction elements of my capacitative chopper. The capacitance variation of vibratory capacitor 4 is maintained at an accurately fixed amplitude regardless of mechanical changes in its configuration, such as may be brought about by variation of over-all ambient temperature, transient strains caused by an unusual acceleration of a missile maneuver, etc., as well as regardless of any change in the supply voltages feeding the feedback loop or any change in the characteristics of the circuit elements composing it. Two section resistor-capacitor filter 78 provides a D.C. bias on base 114 from 4,000 cycle energy from transistor 105.

Certain alternate embodiments of my invention are possible.

I prefer that a magnetostrictive vibratory capacitor be employed in my system. However, where precision may not be needed an electromechanical equivalent may be employed such as magnetic-attraction or piezo-electric sonic drive units. Also, reciprocative vibratory motion between two capacitor plates has been illustrated, but another motion or the exercise of electrical influence to produce cyclically variable capacitance may be employed as an element in the system.

In order that my feedback circuit be effective it is only necessary that the driving means for the vibratory capacitor be responsive to changes of driving energy as metered by the feedback circuit.

In FIG. 3 resistor 101 may be replaced with a parallel resonant combination similar to that employed in the main signal path at 80 and 81. The inverse is also true. The objective in any case is to obtain a substantially 4,000 cycle variation free of the 30 kilocycle high frequency energy employed, in the feedback path and to obtain the original variation free of 4,000 cycle energy in the main signal path.

It will be understood that my invention makes possible a speed of response several orders faster than other prior art devices. The latter are invariably operated at frequencies of the order of 60 cycles per second. Because any modulating frequency must be only a fraction of the carrier frequency in a modulation process my high carrier frequency allows a high modulating frequency.

While a vibratory frequency of 4,000 cycles per second has been used as an example herein this parameter may be increased well into the supersonic range, even to 100,000 cycles. For high frequencies the size of the magnetostrictive structure shown in FIG. 2 may be greatly decreased, or this structure may be operated at harmonics of its physical resonant size. The vibratory frequency may also be reduced in my device, with 1,000 cycles constituting a desirable but not a theoretical minimum.

Similarly, although the prior art has ignored and actually taught away from a vacuum enclosure of a vibratory capacitor I have shown how such a technique can increase the precision of devices of this type by a whole order. The work function of the capacitor plates thus stabilized is also known and identified as the inverse of the Fermi level.

In greater detail, the resonant drive capacitor 129 can be dispensed with by the use of a power transistor of increased power rating, should this alternate be attractive for any reason.

The gains of the several amplifiers shown in FIGS. 1 and 3 may be altered to accommodate special conditions. The control level of the feedback loop may be higher or lower by some margin than as described. The amplification of the main A.C. amplifier 7 may be greater if the original signal is of particularly low energy level or vice versa; or it may be different depending upon what use the amplified output signal is put to.

The balanced demodulator 8 and filter 9 may be omitted when a modulated alternating carrier at the vibration frequency is desired. An example of such a requirement is for modulating telemeter transmitters or equivalent devices. It is well known that it is impractical to modulate such transmitters with slowly varying signals such as from a thermocouple and that some type of modulation upon a subcarrier is required. In my system a high degree of amplification and the modulating process is accomplished in one and the same circuit elements.

Batteries 110 and 112 may be replaced by power supplies, which should be regulated for precise work.

Throughout this specification certain definite component values have been given in order to most clearly teach the invention. It should be understood that relatively large variations may be taken from these values or from groups of them and still obtain functioning according to my invention.

Other modifications may be made in the arrangement, size, proportions and shape of the elements of my system and modification of the characteristics of the circuit elements, details of circuit connections and the coactive relation between the elements without departing from the inventive concept.

Having thus fully described my invention and the manner in which it is to be practiced, I claim:

1. A system for stabilizing a vibratory capacitor chopper, comprising: a vibratory capacitor chopper; an electrically controlled driver adapted to vibrate said chopper; sampling means connected to said chopper, said sampling means adapted to present at its output an impedance variation proportional to the variation in capacitance of said chopper; the output of said sampling means connected at a junction to one end of an impedance, the other end of said impedance connected to the output of an oscillator oscillating at a frequency more than one octave higher than the frequency of vibration of said chopper; whereby an electrical signal is developed at said junction comprising the oscillations of said oscillator having impressed upon them an amplitude modulation proportional to the capacitance variation of said chopper; said junction connected to the input of a substantially constant gain amplifier; the output of said constant gain amplifier connected to the input of a comparator, said comparator being adapted to compare the amplitude of the modulation of its input signal with a standard and develop at its output a signal proportional to any deviation of the amplitude of the modulation of its input signal from said standard; the output of said constant gain amplifier also connected to the input of a variable gain amplifier, the output of said comparator connected to said variable gain amplifier so as to control the gain of said variable gain amplifier, whereby there is developed at the output of said variable gain amplifier an electrical signal varying at the frequency of vibration of said chopper and whose amplitude is a function of the deviation of the amplitude of the capacitance variations of said chopper from a standard; the output of said variable gain amplifier connected to said electrically controlled driver, whereby said driver, and consequently the amplitude of the capicitance variations of said chopper, are adjusted to compensate for any deviation from a set standard and are thus stabilized.

2. The system of claim 1 wherein said driver is a magnetostriction driver.

3. The system of claim 1 in which said sampling means comprises a transformer having a primary winding and at least one secondary winding, the two ends of said transformer primary winding connected across said chopper, one end of said transformer secondary winding connected to ground and the other end of said transformer secondary winding connected to said junction.

4. The system of claim 1 in which said comparator comprises a demodulator circuit and a voltage comparison circuit; the output of said constant gain amplifier connected to the input of said demodulator circuit, said demodulator circuit being adapted to rectify its input signal and remove the oscilator frequency therefrom, whereby there is developed at the output of said demodulator a signal proportional to the modulation of the input signal; the output of said demodulator circuit connected to the input of said voltage comparison circuit, said voltage comparison circuit containing a standard voltage source and adapted to compare the amplitude of its input signal variations with said standard voltage and develop at its output an electrical signal proportional to the deviation of said amplitude from said standard voltage.

5. The system of claim 4 wherein said standard voltage source contains a Zener diode and wherein the standard voltage is determined by the Zener characteristics of said Zener diode.

References Cited in the file of this patent

UNITED STATES PATENTS

| | | |
|---|---|---|
| 2,372,062 | Dorsman | Mar. 20, 1945 |
| 2,490,579 | Clewell | Dec. 6, 1949 |
| 2,571,746 | Mouzon | Oct. 16, 1951 |
| 2,658,173 | Reese | Nov. 3, 1953 |
| 2,744,222 | Toomim et al. | May 1, 1956 |
| 2,795,648 | Mason | June 11, 1957 |
| 2,830,240 | Speer | Apr. 8, 1958 |
| 2,886,657 | Hirtreiter | May 12, 1959 |

FOREIGN PATENTS

| | | |
|---|---|---|
| 237,496 | Switzerland | Aug. 16, 1945 |